United States Patent [19]

Araki et al.

[11] Patent Number: 4,745,673
[45] Date of Patent: May 24, 1988

[54] SPINDLE HEAD UNIT OF A MACHINING CENTER

[75] Inventors: Hiroshi Araki; Toshiyuki Aso; Yoshihisa Akiyama, all of Hino, Japan

[73] Assignee: Fanuc Ltd., Yamanashi, Japan

[21] Appl. No.: 85,258

[22] Filed: Aug. 12, 1987

Related U.S. Application Data

[63] Continuation of Ser. No. 709,949, Feb. 27, 1985.

[30] Foreign Application Priority Data

Jun. 29, 1983 [JP] Japan .................. 58-116046

[51] Int. Cl.4 .................. B23C 5/26; B23Q 3/157
[52] U.S. Cl. .................. 29/56.8; 29/26 A; 408/239 A; 409/233
[58] Field of Search .................. 29/26 A, 568; 408/239 A; 409/233

[56] References Cited

U.S. PATENT DOCUMENTS

| | | | |
|---|---|---|---|
| 2,441,046 | 5/1948 | Turrettini | 409/233 |
| 3,680,437 | 8/1972 | Cravens, Jr. | 409/233 |
| 3,868,886 | 3/1975 | Bondie | 409/233 |
| 3,875,848 | 4/1975 | Powell | 409/233 |
| 3,898,971 | 8/1975 | De Caussin | 409/233 |
| 4,135,848 | 1/1970 | Hughes et al. | 408/239 A |
| 4,172,683 | 10/1979 | Shimajiri et al. | 408/239 |
| 4,290,720 | 9/1981 | Ferreira | 408/239 A X |

FOREIGN PATENT DOCUMENTS 755455 8/1980 U.S.S.R. .................. 409/233

Primary Examiner—Z. R. Bilinsky
Attorney, Agent, or Firm—Armstrong, Nikaido, Marmelstein & Kubovcik

[57] ABSTRACT

A spindle head unit having a bell crank lever (24) mounted pivotally on a spindle head (10) of a machining center to depress a drawbar (18) inserted through a spindle (14) mounted on the spindle head (10). One of arms of the bell crank lever (24) is located so as to be capable of being engaged with a guide cam (28) and a depressing end (24a) in the shape of a spherical protrusion which is not connected mechanically to an upper end (18a) of the drawbar (18) is formed in a free end of the other arm of the bell crank lever (24). The bell crank lever (24) is urged continuously by a spring means (32) so that the former arm is urged toward the guide cam (28).

3 Claims, 3 Drawing Sheets

SPINDLE HEAD UNIT OF A MACHINING CENTER

This application is a continuation of application Ser. No. 709,949 filed Feb. 27, 1985.

DESCRIPTION

1. Technical Field

The present invention relates to a spindle head unit of a machining center equipped with an automatic tool changer, and more specifically, to a spindle head unit of a machining center having a simplified tool changing mechanism employing a draw bar of the spindle when automatically changing tools between a tool magazine and the spindle.

2. Background Art

A machining center is equipped with an automatic tool changing device having a tool magazine and carries out diversified machining processes automatically and quickly by indexing a desired tool among a plurality of tools mounted on the tool magazine, and then automatically changing the tool which has been used on the spindle for the desired tool. Accordingly, a machining center, in general, is equipped with a spindle head unit comprising, in combination, a spindle head and a tool changing mechanism for removing a tool which has been used from the spindle, and then mounting a desired tool on the spindle for automatic tool changing. An example of a prior art embodiment of a machining center equipped with such a spindle head unit is shown in FIGS. 1 and 2.

Referring to FIGS. 1 and 2, this conventional machining center is equipped with a spindle head 3 supported on a column 2 above a work table 1 for vertical movement, and the tool magazine 3a of an automatic tool changing device is provided on the front side of the spindle head 3. A plurality of tools T to be changed automatically are held on the tool magazine 3a. The spindle head 3 has a cylindrical spindle 4, a drawbar 5 disposed inside the spindle 4 for vertical movement, with the upper end projecting from the upper end of the spindle 4 and adapted to make, in cooperation with the spindle 4, the lower end of the spindle 4 clamp a desired tool T through upward movement relative to the spindle 4, and to release a tool T which has been used from the lower end of the spindle 4 through downward movement relative to the spindle 4. A spring 6 urges the drawbar 5 upward relative to the spindle 4, and a drawbar depressing lever 8 is pivotally mounted on the spindle head 3 so as to engage a cam 7 provided on the column 2 when the spindle head 3 is raised to a predetermined height, and thereby is moved so as to depress the drawbar 5. That is, the machining center is equipped with a spindle head unit having the depressing lever 8 adapted to be controlled by the cam 7 fixed to the column 2 for swing motion about a pivotal axis, and adapted to drive the drawbar 5 for vertical motion to control the tool changing operation. On the other hand, the spindle 4 is driven for rotation by a spindle driving motor, not shown, through a belt-pulley mechanism 4a.

In the above-mentioned conventional spindle head unit of a machining center, the drawbar depressing lever 8 is connected to the drawbar 5 through a connecting pin 9, and hence the drawbar 5 rotates together with the spindle 4, because the spindle 4, the tool, and the drawbar 5 are connected firmly together when the spindle 4 clamps the tool in cooperation with the drawbar 5.

Accordingly, in such a conventional spindle head unit, a drawbar housing 5b is mounted rotatably through bearings 5a on the upper end of the drawbar 5 and joined to the drawbar depressing lever 8 by a pin 9. This constitution requires a complex connecting mechanism for interlocking the drawbar 5 and the drawbar depressing lever 8, and causes an increase in the number of parts and a deterioration in the facility of the assembling work. Furthermore, such a constitution suffers unavoidably from vibrations in the connecting mechanism interconnecting the drawbar 5 and the drawbar depressing lever and thus produces noise.

DISCLOSURE OF THE INVENTION

Accordingly, it is an object of the present invention to provide a spindle head unit of a machining center, by which those problems in the conventional spindle head unit of the prior art are eliminated.

The present invention provides a spindle head unit of a machining center, comprising a spindle head supported for vertical movement above a work table on a column, a cylindrical spindle held in the spindle head, a drawbar disposed vertically and movably within the spindle with the upper end thereof protruding upward from the spindle and arranged in such a manner that a changeable tool is clamped in a lower end of the spindle through cooperation of the spindle and the drawbar when the drawbar is raised relative to the spindle, and that a tool which has been used is released from the lower end of the spindle when the drawbar is moved downward, a spring for urging the drawbar upward relatively to the spindle, and a drawbar depressing lever pivotally mounted on the spindle head so as to engage a cam provided on the column when the spindle head is raised to a predetermined height, and thereby to be turned in a direction to depress the drawbar, characterized in that the drawbar depressing lever is provided at one end thereof with a depressing means which is pressed against an upper end surface of the drawbar to apply a downward pressure to the drawbar when the drawbar depressing lever is turned toward the drawbar by the cam, and that another spring is provided to urge the depressing means so that the depressing means is separated from the upper end surface of the drawbar when the drawbar depressing lever is turned in the reverse direction by the cam. In this constitution, it is preferable that the upper end surface of the drawbar has the form of a flat pressure-receiving surface and the depressing means of the drawbar depressing lever is formed as a spherical protrusion at the end of the drawbar depressing lever. Furthermore, it is desirable that the latter spring is a compression spring capable of urging one arm of the drawbar depressing lever formed as a bell crank lever toward the cam.

BEST MODE FOR CARRYING OUT THE INVENTION

Figure 1:
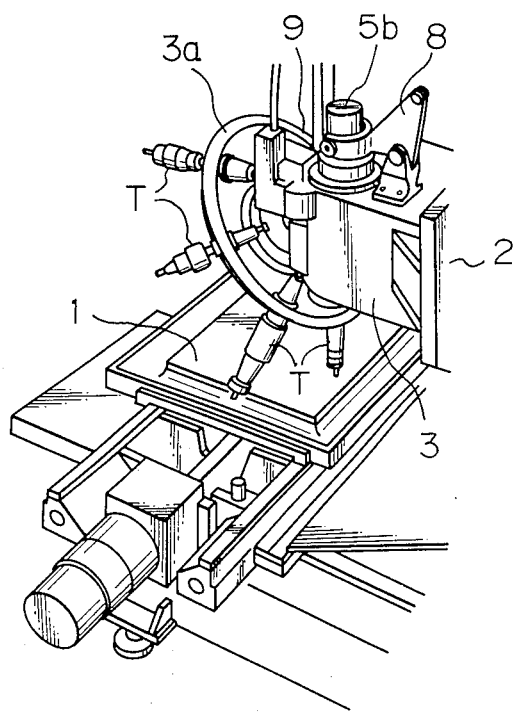
FIG. 1 is a perspective view of a machining center equipped with a conventional spindle head unit.
Figure 2:
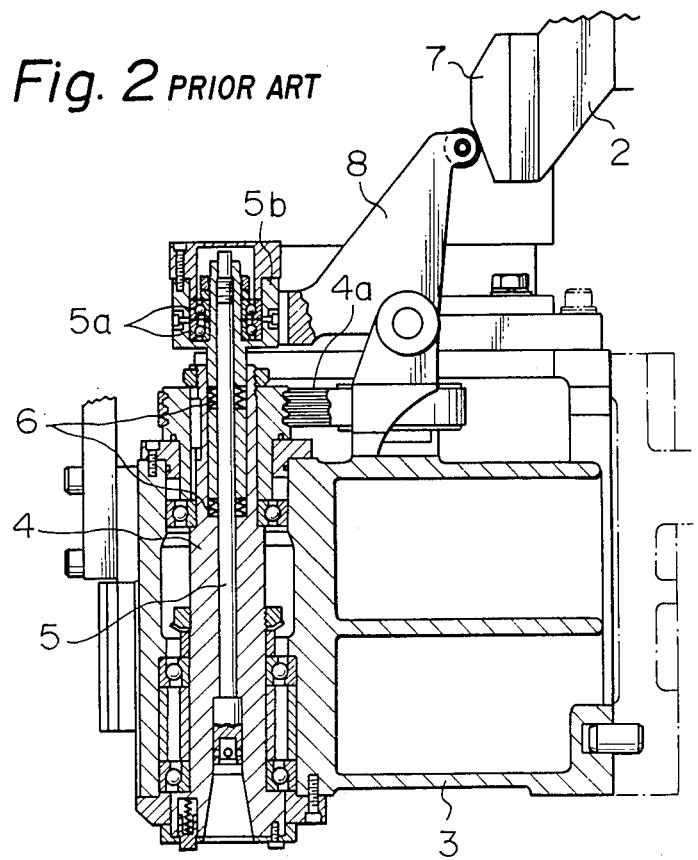
FIG. 2 is a sectional view of the essential part of the spindle head unit of FIG. 1.
Figure 4:
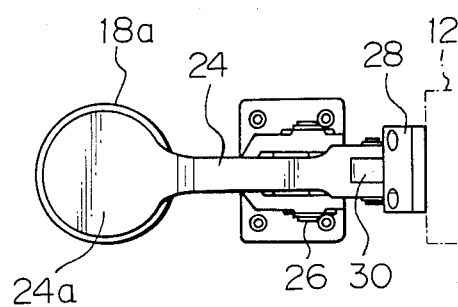
FIG. 4 is a plan view of the essential part of the spindle head unit of FIG. 3.
Figure 3:
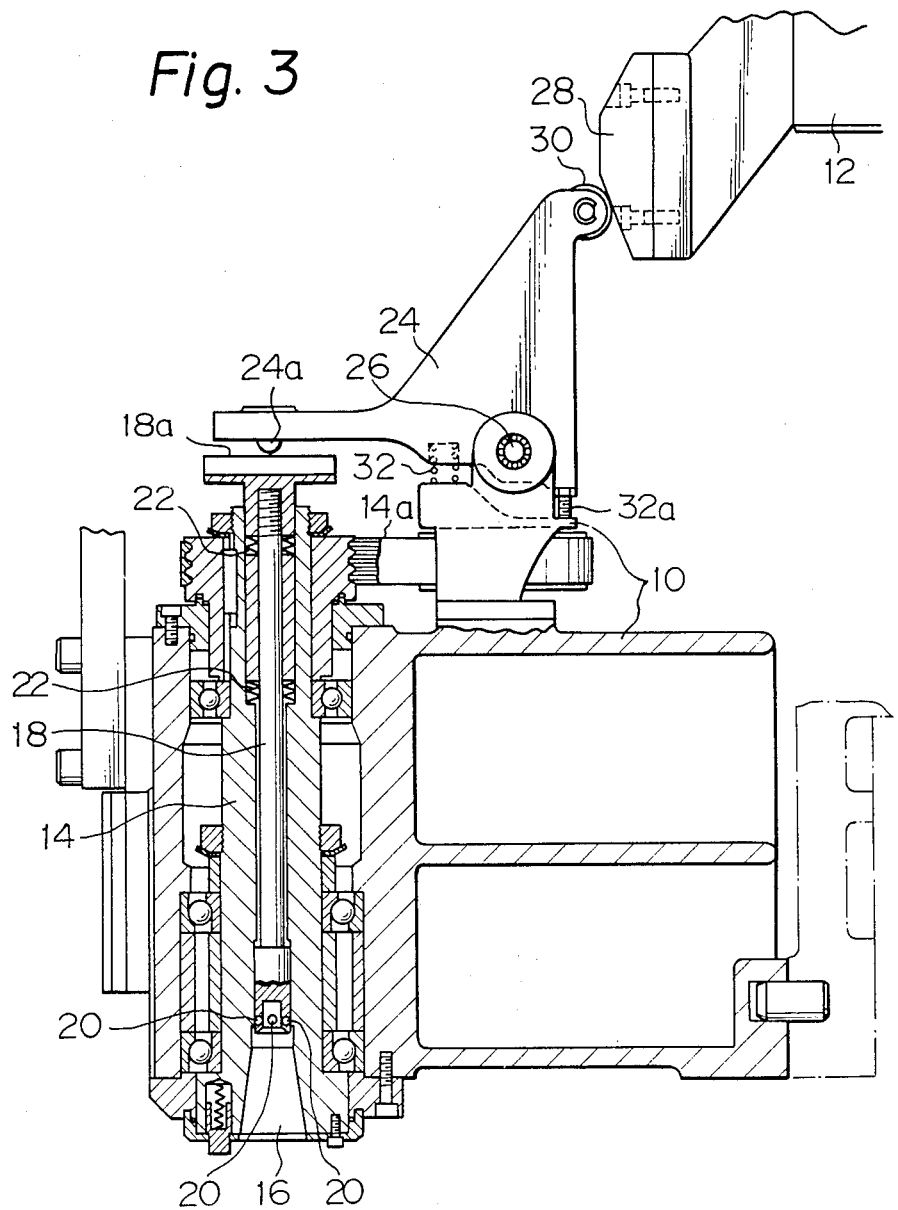
FIG. 3 is a sectional view showing the essential part of a spindle head unit of a machining center, according to the present invention.

Referring to FIGS. 3 and 4 which show a preferred embodiment of the present invention, a spindle head unit of a machining center has a spindle head 10 capable of moving vertically above a work table. The spindle head 10 is supported on a machine body 12 by a supporting mechanism, not shown.

A cylindrical spindle 14 is supported vertically so as to rotate about the center axis thereof on the spindle head 10. The spindle 14 is driven for rotation by a spindle driving motor, not shown in FIG. 3, through a belt-pulley device 14a. A tool receiving part 16 for receiving a tool supplied by an automatic tool changer, not shown, is formed in the lower end of the spindle 14. Although not shown herein, ordinarily, the automatic tool changer has a tool transfer means for transferring a tool to a position directly below the spindle 14 and a tool magazine for holding a plurality of tools, however, the automatic tool changer may be of the type not having a tool transfer means, but having a tool magazine disposed in front of the spindle head 10 in an inclined position and adapted to be rotated for indexing to locate a desired tool at a position directly below the spindle 14.

The tool receiving part 16 of the spindle 14 is brought into engagement with or disengaged from a tool through the vertical movement of the spindle head 10.

A drawbar 18 is provided so as to be vertically movable within the spindle 14 with an upper end surface 18a thereof projecting upward from the spindle 14.

In the tool receiving part 16, the drawbar 18 retains a plurality of balls 20 for clamping a tool at a pull stud formed in the top end of the tool. When the drawbar 18 is moved upward relative to the spindle 14, the balls 20 are acted on by the inner surface of a reduced diameter of the tool receiving part 16 so as to be engaged with the pull stud of the tool so that the tool is firmly clamped in the lower end of the spindle 14. When the drawbar 18 is moved downward relative to the spindle 14, the balls 20 are allowed to be disengaged from the pull stud of the tool, so that the tool is released from the lower end of the spindle 14.

A plurality of coned disk springs 22 for urging the drawbar 14 upward relative to the spindle 14 are provided between the inner periphery of the spindle 14 and the outer periphery of the drawbar 18 so that the drawbar 18 is capable of being pushed up to a fixed height relative to the spindle 14.

A drawbar depressing lever 24 is mounted pivotally by a horizontal shaft 26 on the upper surface of the spindle head 10. A roller 30 which comes into engagement with a cam 28 provided on the machine body 12 when the spindle head 10 is raised to a fixed height is provided on one end of the lever 24. The lever 24 has a pressing end 24a which depresses the drawbar 18 at the upper end surface 18a relative to the spindle 14 when the roller 30 of the lever 24 is brought into engagement with the cam 28. The depressing end 24a has a spherical surface facing the upper end surface 18a of the drawbar 18.

A spring 32 for urging the lever 24, so that the depressing end 24a is separated from the upper end surface 18a of the drawbar 18 while the lever 24 is not in engagement with the cam 28, is disposed between the spindle head 10 and the lever 24. A turn limiting bolt 32a for limiting the turn of the lever 24 is disposed between the spindle head 10 and the lever 24. The turn limiting bolt 32a limits the excessive turn of the lever 24 on the horizontal shaft 26 due to the action of the spring 32 when the lever 24 is disengaged from the cam 28.

In this embodiment, when changing the tool, the spindle head 10 is raised together with a tool magazine, not shown, and thereby the roller 30 of the lever 24 is moved along the surface of the cam 28, so that the depressing end 24a of the lever 24 depresses the drawbar 18. Consequently, the tool is released from the tool receiving part 16 of the spindle 14. Then, the spindle head 10 is raised further relative to the tool magazine to bring the lower end of the spindle 14 above the tool. In this state, the roller of the lever 30 is located above the cam 28.

After the tool has been removed and another new tool has been indexed to a position directly below the spindle 14, the spindle head 10 is lowered, and thereby the new tool is received in the tool receiving part 16. With the downward movement of the spindle head 10, the roller 30 of the lever 24 rides on the cam 28 from above, and thereby the drawbar 18 is depressed again. Consequently, the pull stud of the tool is received in the space between the balls 20 of the drawbar 18. After the roller 30 of the lever 24 has been moved below the cam 28, the drawbar 18 is released from the depression of the lever 24. Consequently, the drawbar 18 is forced to move upward relative to the spindle 14 by the resilient force of the coned disk springs 22, and hence the balls 20 are engaged with the neck of the tool and the spindle 14, and the tool and the drawbar 18 are firmly connected together. That is, the tool is clamped in the lower end of the spindle 14.

Then, the spindle head 10 is lowered further together with the tool magazine to the waiting position.

The spindle 14 is driven for rotation as it is lowered and the tool rotates together with the spindle 14. Since the drawbar 18 is connected firmly with the spindle 14 and the tool, the drawbar 18 rotates as the spindle 14 rotates. During the machining operation, since the roller 30 of the lever 24 is not in engagement with the cam 28, the pressing end 24a of the lever 24 is held apart from the upper end surface 18a of the drawbar 18 by the resilient force of the spring 32. Accordingly, the rotation of the drawbar 18 is not transmitted to the lever 24

Although the present invention has been described with reference to a preferred embodiment thereof, the present invention is not limited thereto, but may be, for example, a spindle head unit having a tool clamping mechanism employing a collet. It will be obvious to those skilled in the art that various changes and modifications of the present invention are possible without departing from the scope of the appended claims.

The present invention simplifies the force transmitting mechanism for transmitting the force of the drawbar depressing lever to the drawbar to a high degree, reduces the number of component parts, facilitates the assembling work, reduces the weight, and provides an automatic tool changer with the least possibility of malfunction. Furthermore, the mechanism according to the present invention produces less noise as compared with the conventional mechanism, because the drawbar depressing lever is separated from the drawbar during the rotation of the spindle.

We claim:

1. In a spindle head unit of a machining center of the type having a tool magazine for storing tools therein; a spindle head supported for vertical movement along a column of the machining center, a spindle rotatably mounted in the spindle head and having a tool-receiving end for receiving therein individual tools stored in the tool magazine, a draw-bar disposed for axial movement within the spindle between a tool-engaging position and a tool-disengaging position, the draw-bar having one end engagable with a tool received in the tool-receiving end of the spindle when the draw-bar is at its tool-engaging position, the draw-bar having another end extending axially beyond the spindle, elastic pressure means continously urging the draw-bar towards its tool-engaging position, a draw-bar actuating cam member fixed to the column and having an actuating surface, and a bell-crank lever mounted at a corner thereof for pivotal movement about a pivot mounted on the spindle head, the bell-crank having a cam member-engaging arm and a draw-bar-depressing arm, an end of the cam-member-engaging arm of the bell-crank lever being disposed for engagement with the cam member actuating surface upon upward movement of the spindle head so as to actuate the bell-crank lever to move about its pivot so that the draw-bar-depressing arm of the bell-crank lever depresses the draw-bar toward the tool-disengaging position thereof, the improvement comprising:

- an upper end surface member provided upon the other end of the drawbar;
- the drawbar-depressing-arm of the bell-crank lever being disposed above the upper end surface member of the draw-bar;
- a spherical depressing member directly attached at an under surface of the draw-bar-depressing arm of the bell-crank lever, for point contact with the upper surface member of the draw-bar so as to depress the draw-bar in response to arc movement of the draw-bar-depressing arm of the bell-crank lever by the cam member actuating surface;
- a spring member arranged between the spindle head and the bell-crank lever adjacent the pivot thereof for urging the bell-crank lever in a direction about the pivot thereof to separate the spherical depressing member form the axially extended draw-bar end so as to hold apart the draw-bar-depressing arm of the bell-crank lever from draw-bar while the bell-crank cam member-engaging end is disengaged from the cam member actuating surface; and
- an adjustable limiting member disposed between the spindle head and the bell-crank lever ajdacent the pivot thereof, for limiting excessive pivoting of the bell-crank lever under urging of the spring member when the bell-crank cam-engaging end is disengaged from the cama member actuating surface.

2. The improved spindle head unit of claim 1, wherein an end surface of the axially extending end of the draw-bar is formed as a flat pressure-receiving surface, and the sperhical depressing member of the bell-crank lever draw-bar-depressing arm is a sperical protrusion surface provided on the draw-bar-depressing arm or the bell-crank lever.

3. The improved spindle head unit of claim 1, wherein the spring member is a compression spring urging the cam member-engaging end of the bell-crank lever toward the cam member actuating surface.

* * * * *